US010216437B2

(12) United States Patent
Tipton et al.

(10) Patent No.: US 10,216,437 B2
(45) Date of Patent: *Feb. 26, 2019

(54) STORAGE SYSTEMS AND ALIASED MEMORY

(71) Applicant: MICROSOFT TECHNOLOGY LICENSING, LLC, Redmond, WA (US)

(72) Inventors: William R. Tipton, Seattle, WA (US); Surendra Verma, Bellevue, WA (US); Landy Wang, Honolulu, HI (US); Malcolm James Smith, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/608,690

(22) Filed: May 30, 2017

(65) Prior Publication Data

US 2017/0262207 A1  Sep. 14, 2017

Related U.S. Application Data

(63) Continuation of application No. 14/036,298, filed on Sep. 25, 2013, now Pat. No. 9,678,689.

(Continued)

(51) Int. Cl.
*G06F 12/00* (2006.01)
*G06F 3/06* (2006.01)
*G06F 12/0866* (2016.01)

(52) U.S. Cl.
CPC ............ *G06F 3/0619* (2013.01); *G06F 3/065* (2013.01); *G06F 3/0679* (2013.01); *G06F 12/0866* (2013.01); *G06F 2212/214* (2013.01)

(58) Field of Classification Search
None
See application file for complete search history.

(56) References Cited

U.S. PATENT DOCUMENTS

| 5,119,290 A | 6/1992 | Loo et al. |
| 6,438,672 B1 | 8/2002 | Fischer et al. |

(Continued)

FOREIGN PATENT DOCUMENTS

| CN | 1512354 A | 7/2004 |
| CN | 101887350 A | 11/2010 |

(Continued)

OTHER PUBLICATIONS

"First Office Action and Search Report Issued in Chinese Patent Application No. 201480030762.4", dated Nov. 27, 2017, 6 Pages. (W/o English Translation).

(Continued)

*Primary Examiner* — Daniel D Tsui
(74) *Attorney, Agent, or Firm* — Han Gim; Newport IP, LLC

(57) ABSTRACT

Aspects of the subject matter described herein relate to storage systems and aliased memory. In aspects, a file system driver or other component may send a request to a memory controller to create an alias between two blocks of memory. One of the blocks of memory may be used for main memory while the other of the blocks of memory may be used for a storage system. In response, the memory controller may create an alias between the blocks of memory. Until the alias is severed, when the memory controller receives a request for data from the block in main memory, the memory controller may respond with data from the memory block used for the storage system. The memory controller may also implement other actions as described herein.

20 Claims, 9 Drawing Sheets

Related U.S. Application Data

(60) Provisional application No. 61/828,636, filed on May 29, 2013.

(56) References Cited

U.S. PATENT DOCUMENTS

| | | | |
|---|---|---|---|
| 6,625,725 | B1 | 9/2003 | Wu et al. |
| 7,872,657 | B1 | 1/2011 | Edmondson et al. |
| 8,194,452 | B2 | 6/2012 | Rao |
| 9,552,176 | B2 | 1/2017 | Lee et al. |
| 9,678,689 | B2 * | 6/2017 | Tipton .................. G06F 3/0619 |
| 2002/0116581 | A1 | 8/2002 | Donoghue et al. |
| 2005/0138307 | A1 | 6/2005 | Grimsrud et al. |
| 2007/0033318 | A1 | 2/2007 | Gilday et al. |
| 2008/0005459 | A1 | 1/2008 | Norman |
| 2008/0022040 | A1 | 1/2008 | Joukan et al. |
| 2009/0031072 | A1 * | 1/2009 | Sartore ............... G06F 12/0638 711/102 |
| 2011/0029723 | A1 | 2/2011 | Lee et al. |
| 2013/0339572 | A1 * | 12/2013 | Fanning .............. G06F 12/1009 711/102 |
| 2014/0310451 | A1 | 10/2014 | Lee et al. |

FOREIGN PATENT DOCUMENTS

| | | |
|---|---|---|
| CN | 101937374 A | 1/2011 |
| CN | 104011690 A | 8/2014 |
| JP | 5158782 A | 6/1993 |
| JP | 2004362464 A | 12/2004 |
| RU | 2257609 C2 | 7/2005 |
| WO | 2013048483 A1 | 4/2013 |

OTHER PUBLICATIONS

"Notice of Allowance Issued in Japanese Patent Application No. 2016-516745", dated Mar. 12, 2018, 6 Pages.

"Office Action Issued in European Patent Application No. 14802963.0", dated Jan. 2, 2018, 6 Pages.

"Office Action Issued in Russian Patent Application No. 2015151012", dated Apr. 18, 2018, 9 Pages.

"Final Office Action Issued in U.S. Appl. No. 14/036,298", dated Nov. 23, 2016, 10 Pages.

"Non Final Office Action Issued in U.S. Appl. No. 14/036,298", dated May 4, 2016, 9 Pages.

"Notice of Allowance Issued in U.S. Appl. No. 14/036,298", dated Feb. 14, 2017, 5 Pages.

Dhiman, et al., "PDRAM: A Hybrid PRAM and DRAM Main Memory System", In Proceedings of the 46th Annual Conference on Design Automation, Jul. 26, 2009, 6 Pages.

Eisner, et al., "Quill: Exploiting Fast Non-Volatile Memory by Transparently Bypassing the File System", In UCSD CSE Technical Report: CS2013-0991, Jan. 28, 2013, 6 Pages.

Kwon, et al., "A Case Study on the Application of Real Phase-Change RAM to Main Memory Subsystem", In Proceedings of the Conference on Design, Automation & Test in Europe, Mar. 12, 2012, 4 Pages.

Lee, et al., "Phase Change Memory Architecture and the Quest for Scalability", In Magazine: Communications of the ACM, vol. 53, Issue 7, Jul. 2010, pp. 99-106.

Lung, Hsiang-Lan, "Phase Change Memory: Replacement or Transformational", In Proceedings of 4th Workshop on Innovative Memory Technologies, Jun. 21, 2002, 35 Pages.

Park, et al., "High-Performance Scalable Flash File System Using Virtual Metadata Storage With Phase-Change RAM", In IEEE Transactions on Computers, vol. 60, Issue 3, Mar. 2011, pp. 321-334.

Park, et al., "Linux Kernel Support to Exploit Phase Change Memory", In Proceedings of the Linux Symposium, Jul. 13, 2010, 10 Pages.

Ramos, et al., "Page Placement in Hybrid Memory Systems", In Proceedings of the International Conference on Supercomputing, May 31, 2011, 11 Pages.

Wu, et al., "SCMFS: A File System for Storage Class Memory", In Proceedings of International Conference for High Performance Computing, Networking, Storage and Analysis, Nov. 12, 2011, 11 Pages.

Qureshi, et al., "Scalable High Performance Main Memory System Using Phase-Change Memory Technology", In Proceedings of the 36th Annual International Symposium on Computer Architecture, Jun. 20, 2009, 10 Pages.

"Second Written Opinion Issued in PCT Application No. PCT/US2014/039634", dated Sep. 10, 2015, 6 Pages.

"International Search Report and Written Opinion Issued in PCT Application No. PCT/US2014/039634", dated Feb. 10, 2015, 9 Pages.

* cited by examiner

STORAGE SYSTEMS AND ALIASED MEMORY

CROSS REFERENCE TO RELATED APPLICATIONS

This application is a continuation of U.S. patent application Ser. No. 14/036,298 filed Sep. 25, 2013, which claims the benefit of U.S. Provisional Application No. 61/828,636, filed May 29, 2013, both of which are hereby incorporated by reference herein in their entirety.

BACKGROUND

Memory for a computer system has traditionally been divided into volatile and nonvolatile memory. Volatile memory requires power to maintain data stored thereon. Nonvolatile memory can retain data even when not powered. Previously, computers have used both volatile and nonvolatile memory because each has certain advantages. For example, volatile memory is typically much faster than nonvolatile memory while nonvolatile memory often costs much less per bit. Advances in nonvolatile memory technology are closing the gap in speed between volatile and nonvolatile memory while nonvolatile memory maintains the advantage of preserving data during power loss.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to storage systems and aliased memory. In aspects, a file system driver or other component may send a request to a memory controller to create an alias between two blocks of memory. One of the blocks of memory may be used for main memory while the other of the blocks of memory may be used for a storage system. In response, the memory controller may create an alias between the blocks of memory. Until the alias is severed, when the memory controller receives a request for data from the block in main memory, the memory controller may respond with data from the memory block used for the storage system. The memory controller may also implement other actions as described herein.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first," "second," "third," and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
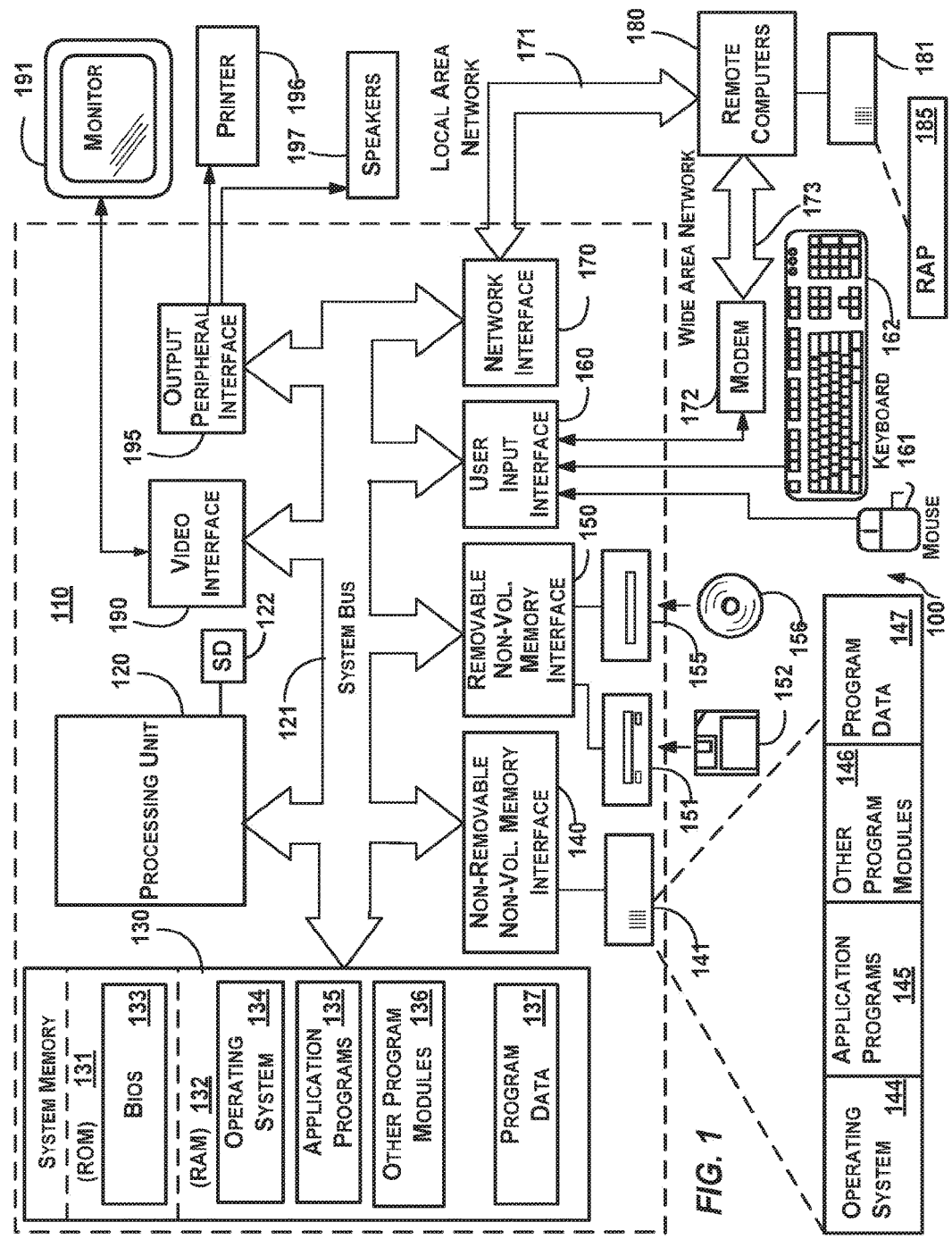
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCie).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs), Blu-ray Disc (BD) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 may include computer storage media in the form of volatile and/or nonvolatile memory such as read only memory (ROM) 131 and random access memory (RAM)

132. Nonvolatile memory may be substituted for some or all of the ROM 131 and/or the RAM 132. For example, memristor memory, phase-change memory (PCM), or some other type of nonvolatile memory may be used instead of, or in addition to, the ROM 131 and/ or the RAM 132.

A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, BD, or other optical media.

In one implementation, memristor memory, phase-change memory, or some other type of nonvolatile memory may be used instead of, or in addition to, the hard drive 141.

Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that they may be different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Nonvolatile Memory

Figure 2:
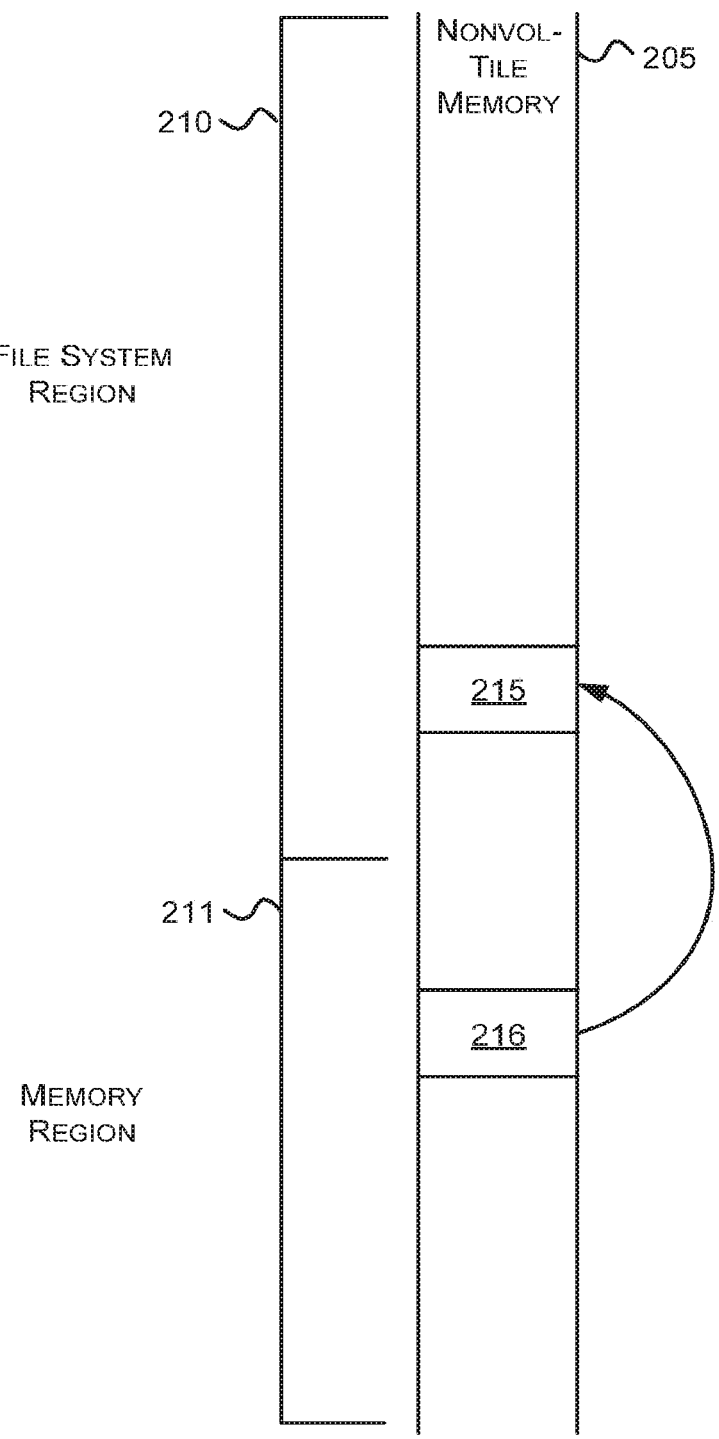
FIGS. 2 and 5 are block diagrams that generally represent nonvolatile memory in accordance with aspects of the subject matter described herein.
Figure 5:
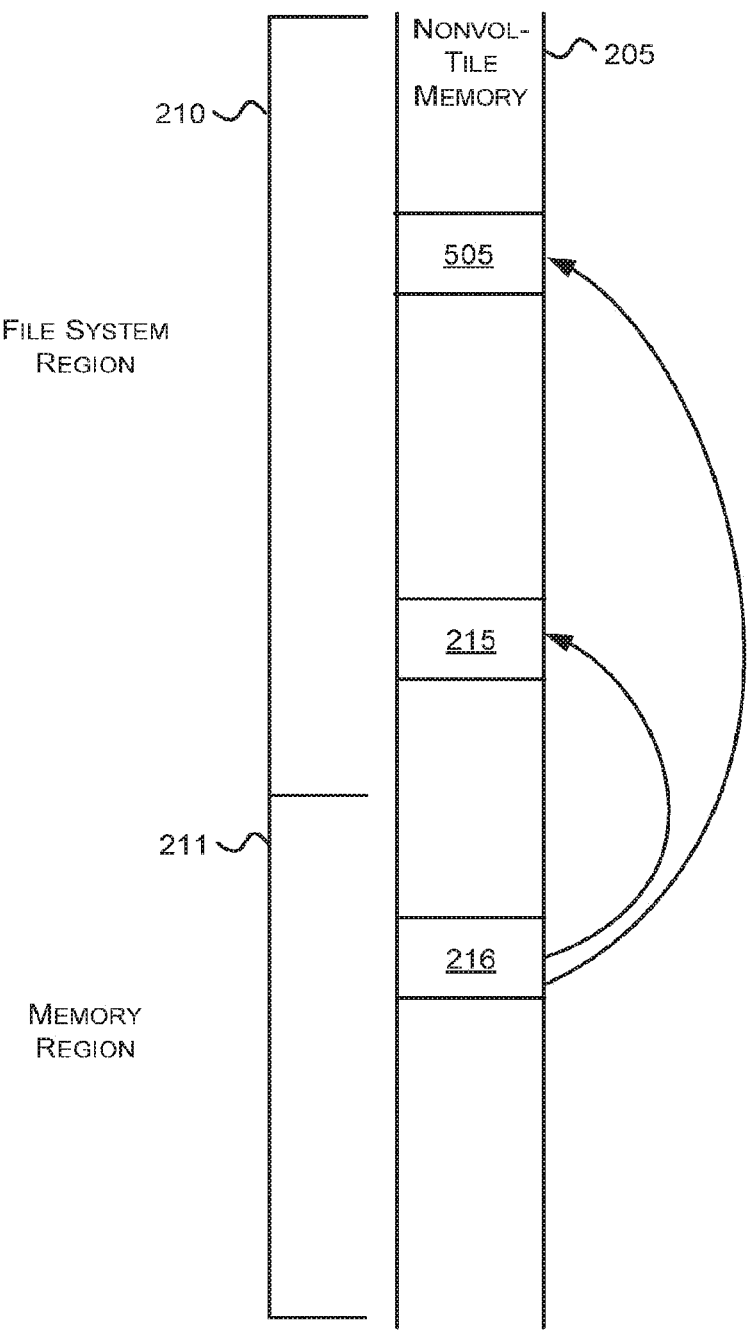

As mentioned previously, advances are being made in nonvolatile memory. In accordance with aspects of the subject matter described herein, an operating system may be structured to take advantage of these advances. FIGS. 2 and 5 are block diagrams that generally represent nonvolatile memory in accordance with aspects of the subject matter described herein. The nonvolatile memory 205 may include an array of memory storage elements that may be accessed by addresses. In one implementation, a memory device that includes the nonvolatile memory 205 may be addressed using memory primitives. The memory primitives used to access the nonvolatile memory 205 may be similar or identical to those used to access volatile memory such as RAM.

Fast nonvolatile memory may be attached to a memory bus. For example, currently, some types of nonvolatile memory perform 2-4 times slower than RAM and a couple of orders of magnitude faster than flash memory or hard disk storage. These types of nonvolatile memory may have low latency and high data transfer rates that may benefit more by being attached to a memory bus than being attached to a storage bus.

As illustrated in FIG. 2, the nonvolatile memory 205 has been divided into a file system region 210 and a memory region 211. The illustrated sizes of these regions are exemplary only. In other implementations, for example, these sizes may be greatly varied from the sizes shown in FIG. 2.

Furthermore, the nonvolatile memory 205 may be implemented using one or more subsystems. For example, where multiple types of nonvolatile memory are hosted on a system or where multiple memory units of the same or different types of nonvolatile memory are hosted on the system, the system may include multiple subsystems to access the nonvolatile memory.

Although the term "file system" is sometimes used herein, it is to be understood that this term is exemplary only and that the teachings herein may also be applied to other types of storage systems. A storage system may include one or more hardware and/or software components that organize data that is persisted.

The size of the file system region 210 and the size of the memory region 211 may be set or reset, for example, during a configuration operation. A configuration operation may occur prior to or after installing an operation system to size or resize memory regions as desired. An operating system may be configured to look for configuration data in a predefined location of the nonvolatile memory 205. The configuration data may indicate how the nonvolatile memory is to be divided between file system data and memory available for other uses.

The memory region 211 is a portion of the nonvolatile memory 205 that has been set aside to provide additional main memory for a computer. This memory may be used in lieu of, or in addition to, any RAM or other volatile memory of the computer.

The file system region 210 is a portion of the nonvolatile memory 205 that has been set aside for file system data. Although physically, memory elements in this region may be accessed in the same manner as memory elements in the memory region 211 are accessed, file system components acting in conjunction with memory hardware may enforce certain rules regarding these accesses as described in more detail below.

In traditional file systems, a block of data from a hard disk may be copied into main memory. Once in main memory, the data may be modified. At some point, the block of data as modified is written from the main memory to the hard disk.

In accordance with aspects of the subject matter describe herein, a file system may be structured to avoid some of the copying that occurs in traditional file systems. For example, referring to FIG. 2, an application may seek to obtain data that is in the block 215. Instead of copying the data in the block 215 to memory in the block 216, the file system may request that memory hardware create an alias between the block 216 and the block 215. When an alias is created, an operation that attempts to read the block 216 obtains the data from the block 215 except when certain conditions are met.

After an alias is created, a write to the block 216 causes data to be written to the block 216. In one implementation, the memory hardware may wait to copy the data written to the block 216 to the block 215 until a time after the write of the data to the block 216. In another implementation, the memory hardware may wait for an explicit command from the file system before copying the data written to the block 216 to the block 215. This allows the file system to be more involved when writes occur to the nonvolatile memory 205.

Once a write has occurred to the block 216, one or more aliases from the block 216 to the block 215 may be broken. For example, the block 215 may be implemented by a plurality of sub blocks. In one implementation, a sub block may be a small, fixed-size of memory that can be accessed on a memory architecture that uses the nonvolatile memory 205. In one implementation, a block may correspond to a page of memory while a sub block may correspond to a cache line.

In one implementation, when an alias is set up between the block 216 and the block 215, physically an alias may be set up between each sub block of the block 216 and its corresponding sub block of the block 215. This results in a plurality of aliases between memory elements of the blocks 216 and 215.

In one implementation, when a portion of the block 216 is written to, the sub blocks that include the portion may be determined, and the aliases associated with those sub blocks may be severed. This severing may occur at any time prior to a subsequent read of the block 216. When a subsequent read for the block 216 is received, data for the read is retrieved from the block 215 where the aliases have not been severed and from block 216 where the aliases have been severed.

In another implementation, when a portion of the block 215 is written to, the sub blocks that include the portion may be determined, and the aliases associated with those sub blocks may be severed. This severing may occur at any time prior to a subsequent read of the block 216. When a subsequent read for the block 216 is received, data for the read is retrieved from the block 215 where the aliases have not been severed and via block 216 where the aliases have been severed.

In conjunction with severing an alias between a sub block of block 216 and a sub block of block 215 and prior to overwriting data in the sub block of block 215, the data in the sub block of block 215 may be preserved so that it may be obtained when accessing the corresponding sub block of block 216 (or any other sub block that is aliased to the sub block of block 215). Preserving the data may include, for example, copying the data to a location allocated to block 216, copying the data to a new location and updating the alias of block 216 to point to the new location, keeping the data in its current location and updating mapping structures associated with block 215 so that a read to block 215 obtains the changed data, or the like. This behavior keeps the data obtainable via block 216 unchanged even when the data of block 215 changes.

In one implementation, when a portion of the block 215 is written to or when a portion of the block 216 is written to, aliases are broken as outlined above. In another implementation, aliases are broken in response to writing to the block 216, but not in response to writing to the block 215. In another implementation, aliases are broken in response to writing to the block 215, but not in response to an attempted write to the block 216. The implementation followed in a particular system may be configurable via hardware or software, be hard-wired or hard-coded, or the like.

Figure 3:
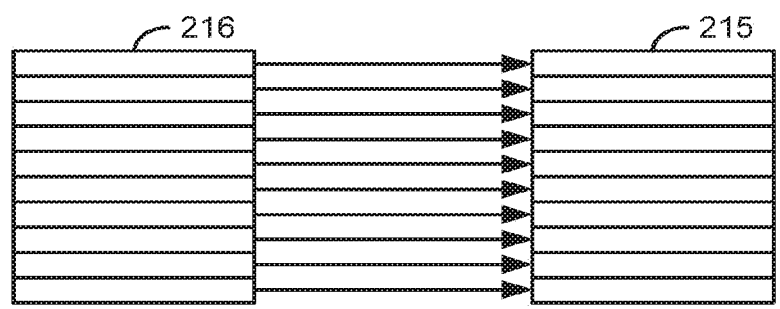
FIG. 3 is a block diagram that generally represents various states of aliases between sub blocks of the memory blocks of FIG. 2 in accordance with aspects of the subject matter described herein.
Figure 3:
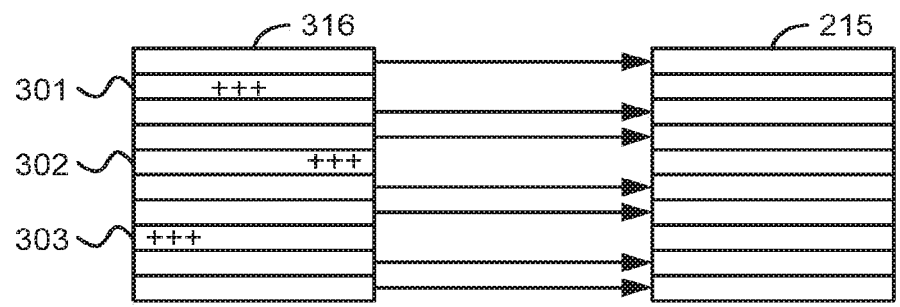

FIG. 3 is a block diagram that generally represents various states of aliases between sub blocks of the memory blocks of FIG. 2 in accordance with aspects of the subject matter described herein. When an alias is set up between the block 216 and the block 215, this may cause a plurality of aliases to be set up between the sub blocks of block 216 and sub blocks of block 215. When a read request for data addressed to block 216 is received in this state, the read is satisfied from the data in the block 215.

The block 316 represents the block 216 after data has been written to the block 216. In particular, data has been written to the sub blocks 301-303. In conjunction with writing data to create the block 316, aliases for the sub blocks 301-303 have been severed. A read addressed to block 316 will retrieve data from the block 215 where the aliases have not been severed and will retrieve data from the block 316 where the aliases have been severed (e.g., for sub blocks 301-303). A memory controller (e.g., the memory controller 410 of FIG. 4) may include circuitry for retrieving the data from the appropriate locations taking into account any aliases that exist.

Figure 4:
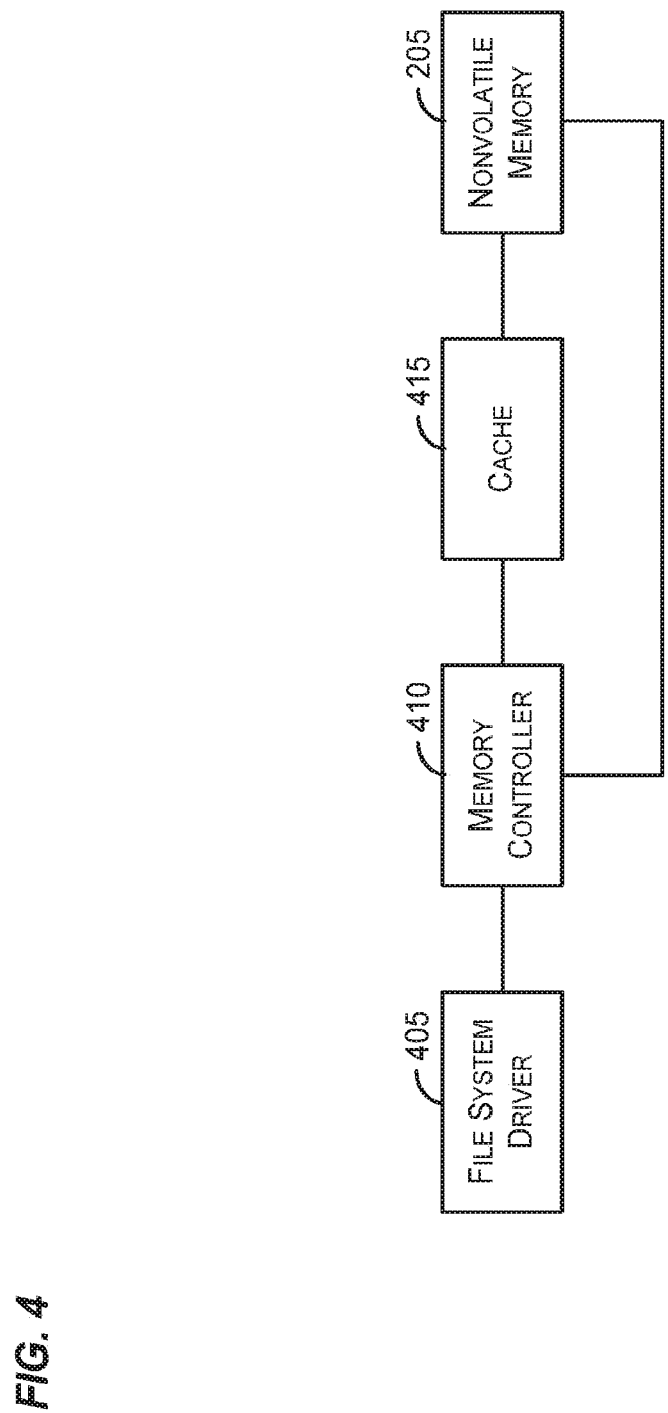
FIGS. 4 and 6 are block diagrams that generally represents exemplary components of systems configured in accordance with aspects of the subject matter described herein.
Figure 6:
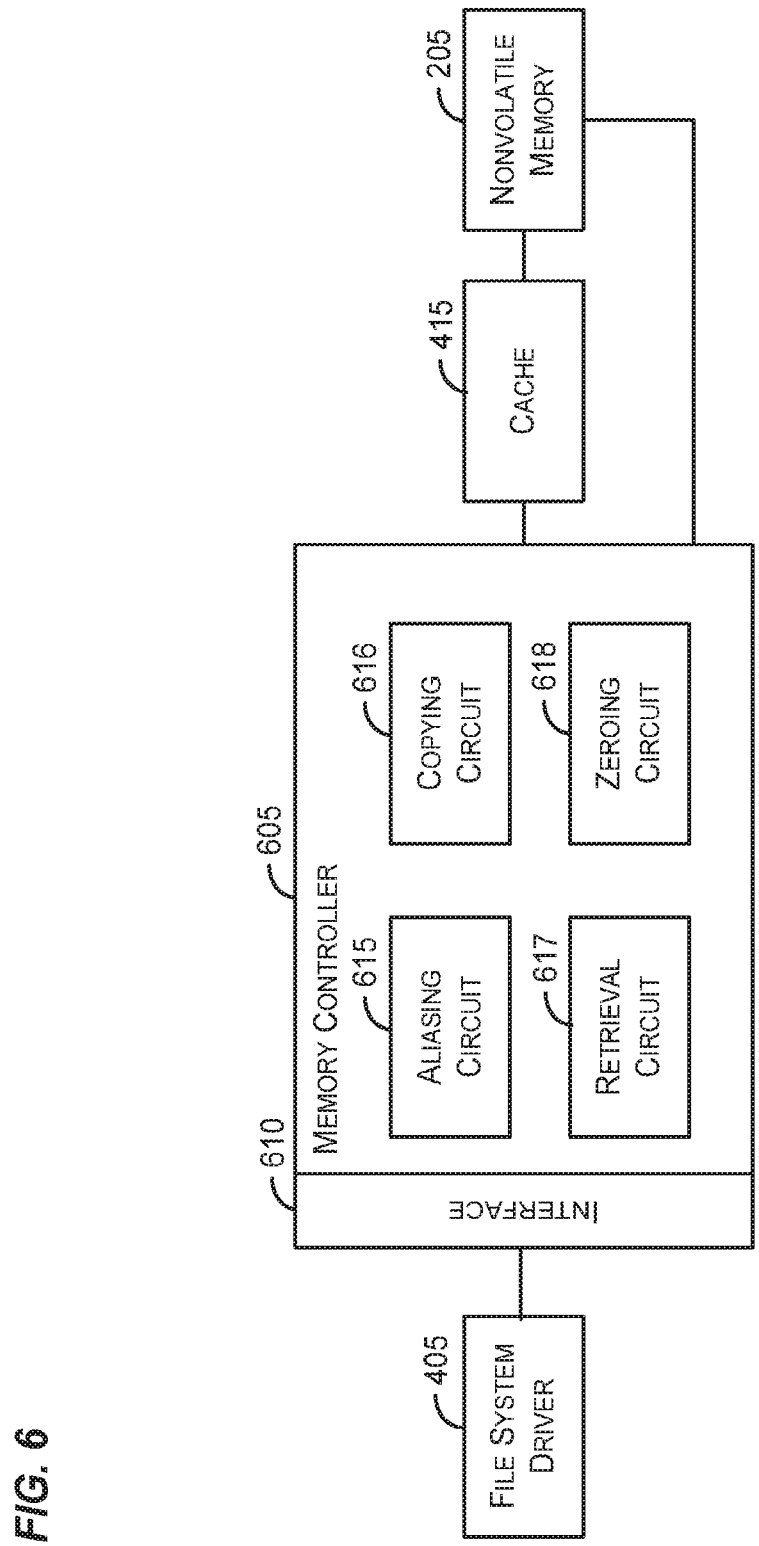

FIGS. 4 and 6 are block diagrams that generally represents exemplary components of systems configured in accordance with aspects of the subject matter described herein. The components illustrated in FIGS. 4 and 6 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIGS. 4 and 6 may be included in other components (shown or not shown) or placed in subcomponents without departing from the spirit or scope of aspects of the subject matter described herein. In some embodiments, the components and/or functions described in conjunction with FIGS. 4 and 6 may be distributed across multiple devices.

The cache 415 may include memory elements that cache data from the nonvolatile memory 205. In one implementation, the cache may comprise dynamic RAM (DRAM), static RAM (SRAM), or some other type of volatile or nonvolatile memory. In some implementations, the cache 415 may be omitted. In some implementations, there may be more than one level of cache.

The memory controller 410 may include a circuit for accessing data on the nonvolatile memory 205. Access as used herein may include reading data, writing data, deleting data, updating data, a combination including two or more of the above, and the like. In one implementation, the memory controller 410 may access the nonvolatile memory 205 using the cache 415 only. In other words, in this implementation, whenever the memory controller 410 reads or writes, it may send the read or write to the cache 415. For a read, the cache 415 may then provide the data from the cache 415 if the cache has the data or obtain the data from the nonvolatile memory 205 and then provide the data if the cache does not have the data. For a write, the cache 415 may store the written data on the cache 415 and may flush the cache to the nonvolatile memory 205 according to caching policies.

In another implementation, the memory controller 410 may also act as a controller for the cache 415 and may obtain data from the cache 415 or the nonvolatile memory 205 as appropriate. In this implementation, the memory controller 410 may also cause the cache 415 to write data to the nonvolatile memory 205 according to caching policies.

The memory controller 410 may include an interface by which the file system driver 405 may send requests and receive data. In particular, this interface may allow communications including the following:

1. A request to create an alias for the nonvolatile memory. In one implementation, the memory controller 410 may be structured to receive a request to alias a block of memory of the nonvolatile memory 205 to another block of memory of the nonvolatile memory 205. After receiving the request, in one implementation, the memory controller 410 may create multiple aliases if the aliased block spans two or more sub blocks.

In another implementation, the memory controller 410 may only create a single alias for each alias request. In this implementation, the file system driver 405 may be expected to determine how many aliases are needed for a given block of memory and to communicate with the memory controller 410 to establish each of the aliases.

2. A request to read a block of memory. In one implementation, the memory controller 410 may be structured to receive a request to read a block of memory of the nonvolatile memory 205. If the block includes memory that is aliased, the memory controller 410 may ensure that the aliased data is obtained from the aliased block (or a cached representation thereof). If the block includes memory that is not aliased, the memory controller 410 may ensure that the aliased data is obtained from a non-aliased block (or a cached representation thereof). If a requested block includes both aliased data and non-aliased data, the memory controller 410 may combine the aliased and non-aliased data in conjunction with responding to the request.

3. A request to write to a block of memory. In one implementation, the memory controller 410 may be structured to receive a request to write to a block of memory of the nonvolatile memory 205. If the block of memory is aliased, the memory controller 410 may ensure that aliases are broken as appropriate at least prior to providing data in response to a read of the aliased block. The memory controller 410 may cause the written data to be written to the cache. The memory controller 410 may flush data from the cache periodically, in accordance with caching policies or in response to an explicit command from the file system driver 405.

4. A request to copy a block of the nonvolatile memory to another location of the nonvolatile memory. In one implementation, the memory controller 410 may be structured to receive copy commands from the file system driver 405. In response to a copy command, the memory controller 410 may logically or physically copy the block to another location of the nonvolatile memory 205. Physically copying the block to the other location may involve reading data of the block and copying the read data to the other location. Logically copying the block may include, for example, leaving the data where it is but changing mapping elements so that the data is returned when requested from the new location.

If portions of the memory to copy are still in the cache 415 and have not been flushed to the nonvolatile memory 205, this may be handled in various ways. For example, in one implementation, the memory controller 410 may ensure that the data in the cache 415 is copied to the destination block with or without flushing that data to the source block.

In another implementation, the file system driver 405 may request that any dirty cache involved in the copy be flushed prior to issuing the copy command.

5. A request to zero some or all of the nonvolatile memory 205 on restart. An operating system may use a portion of the nonvolatile memory 205 as main memory in addition to or in lieu of using RAM. For example, the operating system may load code and data structures into the memory region 211 of FIG. 2. As the nonvolatile memory 205 does not lose data upon power loss, this code and data may remain even after restarting a computer that hosts the nonvolatile memory 205. Having data in the memory region 211 upon restart may pose various problems.

In one implementation, the memory controller 410 may be structured to receive a zero-on-restart request. In response, the memory controller 410 may store data indicating this request and, upon restart, logically or physically zero out a requested portion of the nonvolatile memory 205 (e.g., the memory region 211). Logically zeroing out the requested portion may involve, for example, flagging that the requested portion is zeroed and then waiting to physically zero a block until a read or write request for the block is received. As long as after restart when the file system driver 405 requests a block marked for zeroing, the file system driver 405 receives zeroes for a zeroed block, any implementation that provides this zeroing functionality may be used without departing from the spirit or scope of aspects of the subject matter described herein.

In one implementation, the memory controller 410 may use hardware parallelism to zero portions of a block in parallel. This hardware parallelism may include one or more circuit elements that are able to zero multiple memory elements at the same time.

6. A request to re-alias a block that is currently aliased. An operating system or other process using the nonvolatile memory 205 may, at times, want to move a block in the nonvolatile memory 205 to another location in the nonvolatile memory 205. This may pose a problem if the memory that is moved is involved in an alias. For example, referring to FIG. 5, a process may request that the data in the memory block 215 be moved to the block 505. The memory block 216 may be aliased to point to the memory block 215.

If the alias is not changed to the new block 505, when data in the memory block 215 is changed, a read of data in the memory block 216 may return with the changed data. This may cause problems if, for example, the program expects that the block 216 is still aliased to the data that has not changed (e.g., the data in block 505).

To address this and other issues, the memory controller 410 may be structured to receive a request to re-alias a block that is currently aliased. For example, in one implementation, the memory controller 410 may be structured to receive a request to re-alias memory within a specified range to memory within another specified range. In this implementation, the memory controller 410 may determine all aliases that point to the first specified range and re-alias these aliases to point to the second specified range. In another implementation, the memory controller 410 may be structured to receive a request to re-alias a specific alias to a new location. For example, referring to FIGS. 3 and 4, the memory controller 410 may be structured to receive a request to re-alias one of the aliases for the sub blocks of block 215. In this implementation, when a file system seeks to re-alias a set of aliases for a portion of memory, the file system driver 405 may include logic to determine all aliases for the portion of memory in conjunction with sending commands to re-alias each alias to the memory controller 410.

Returning to FIG. 5, when a re-alias request is received and processed, the alias that previously pointed from block 216 to block 215 may be replaced with an alias that points from block 216 to block 505. A memory controller may be structured to perform a re-aliasing operation in a "safe" manner. Safe in this context means that logically the re-aliasing operation is performed prior to performing other operations that were received subsequent to the re-aliasing request. In one implementation, the memory controller may physically perform other operations as long as the file system driver 405 is unable, using any set of operations, to detect that the re-aliasing operation was performed out-of-order relative to when it was received. A memory controller may implement re-aliasing in other ways without departing from the spirit or scope of aspects of the subject matter described herein. For example, in one implementation, a memory controller may be structured to receive a move block command and may automatically re-alias aliases that point to the block when the block is moved.

In another implementation, a memory controller may be structured to receive a move block command and may modify internal mapping elements to logically move the block without physically copying the block to another location. In some implementations, moving the block in this way may negate the need to perform re-aliasing. For example, if an alias points to the block regardless of mapping information, then when mapping information is changed to move the block, the alias still points at the block.

In another implementation, a memory controller may be structured to receive a re-alias command that is not automatically triggered by a move block command. In this implementation, the file system driver 405 may explicitly request re-aliasing in addition to requesting moving a block as appropriate.

The above examples are not intended to be all-inclusive or exhaustive of ways in which a memory controller may be structured to implement a re-alias command. Based on the teachings herein, those skilled in the art may recognize other implementations that may be used without departing from the spirit or scope of aspects of the subject matter described herein.

The file system driver 405 may be a software and/or hardware component that gives commands and receives responses from the memory controller 410. The file system driver 405 may be part of a storage stack of a file system and 405 may communicate with the memory controller 410 over a system bus or other communication link. The file system driver 405 may provide an interface to the storage stack of a file system that makes the nonvolatile memory 205 appear like other storage (e.g., hard disk, flash memory, other nonvolatile or volatile memory, or the like) available to the storage stack.

Although some of the examples herein have described aliases and other actions regarding nonvolatile memory, the teachings herein may also be applied to implementations in which the file system region and the memory region are implemented using other memory configurations. For example, the file system region and/or the memory region may be implemented with volatile, nonvolatile, or a combination of volatile and nonvolatile memory. Furthermore, the file system region may be implemented on a different memory type than the memory region.

In these implementations, the teachings herein may be applied, for example, to aliases from volatile to volatile memory, aliases from volatile to nonvolatile memory, aliases from nonvolatile to volatile memory, systems that have two or more different types of aliases (e.g., nonvolatile to nonvolatile, volatile to nonvolatile, etc.), and the like. Furthermore, a memory controller such as the memory controller 410 of FIG. 4 may provide an interface that allows aliases to be used, created, re-aliased, and so forth and to perform the other actions described herein without departing from the spirit or scope of aspects of the subject matter described herein.

Turning to FIG. 6, the memory controller 605 is shown with an interface 610 and exemplary circuits 615-618. In one embodiment, a circuit may include only physical components such as resistor, transistors, capacitors, voltage sources, current sources, switches, inductors, and the like.

One or more of the physical components may be integrated into one or more chips. In another embodiment, a circuit may include physical components together with instructions that indicate how the physical components are to operate. The instructions may be encoded in volatile or nonvolatile memory.

The circuits of the memory controller 605 are exemplary and are not meant to be all-inclusive of circuits that may be needed or included. Furthermore, the number of circuits may differ in other embodiments without departing from the spirit or scope of aspects of the subject matter described herein. In some embodiments, the circuits described in conjunction with FIG. 6 may be included in other circuits or placed in sub circuits without departing from the spirit or scope of aspects of the subject matter described herein.

The interface 610 may include a structure by which the file system driver 405 may communicate with the memory controller 605. For example, the interface 610 may allow the file system driver to communicate with the memory controller 605 via electrical, optical, or other signals that encode requests and responses to those requests. The interface 610 may also be structured to allow communications as indicated in conjunction with FIG. 4.

For example, the interface 610 may be structured to receive a request to create an alias between a storage system block of memory and a main memory block of memory. A storage system block of memory may be used, for example, in maintaining storage system data and may correspond to the file system region 210 of FIG. 2 for example. A main memory block may be used for main memory of the computer and may correspond to the memory region 211 of FIG. 2.

The aliasing circuit 615 may be structured to create an alias between a storage system block of memory and a main memory block of memory as requested by the file system driver. As indicated previously, creating an alias between these memory blocks may include creating a plurality of aliases between sub blocks of these blocks. The aliasing circuit 615 may be further structured to sever an alias to a sub block in response to a request to write to the sub block. In one implementation, the aliasing circuit 615 may wait to sever the alias to the sub block until just before servicing a request to read from the sub block. The aliasing circuit 615 may also be structured to re-alias an aliased block in response to a request to move the aliased block, for example.

The copying circuit 616 may be structured to respond to a request to copy a main memory block to a new location. In one implementation, the copying circuit 616 may respond by physically copying data in the main memory block to the new location. In another implementation, copying circuit 616 may logically copy the data in the main memory block to the new location by leaving the data in the main memory block and updating mapping elements as previously described.

The zeroing circuit 618 is structured to respond to a request to zero a requested range of memory. The requested range of memory may include some or all of memory used for main memory. In one implementation, the zeroing circuit 618 may zero a requested range of the memory by flagging that the requested range is zeroed. In one embodiment, the zeroing circuit 618 may wait to physically zero a portion of the requested range until a read or write request for the portion is received by the memory controller 605. In another embodiment, the zeroing circuit 618 may place zeroes in a read cache in response to a read for memory that has been flagged as zeroed. In this embodiment, the zeroing circuit 618 may not actually physically zero the flagged range but the read for memory may return zeroes as it is serviced from the read cache. In one implementation, the zeroing circuit may wait to zero (e.g., physically or logically) the memory until after receiving an indication of restart of a computer hosting the main memory.

The retrieval circuit 617 may be structured to respond to a read request of the file system driver. Where some aliases have been severed, the retrieval circuit 617 may respond to a request by obtaining first data from sub blocks of the storage system block where aliases have not been severed and to obtain second data from sub blocks of the main memory block where aliases have been severed and then combining the first data and the second data to respond to the read request.

In one example, a main memory block of memory may include a page of memory that may be broken into sub blocks where each sub block corresponds to a cache line.

Figure 7:
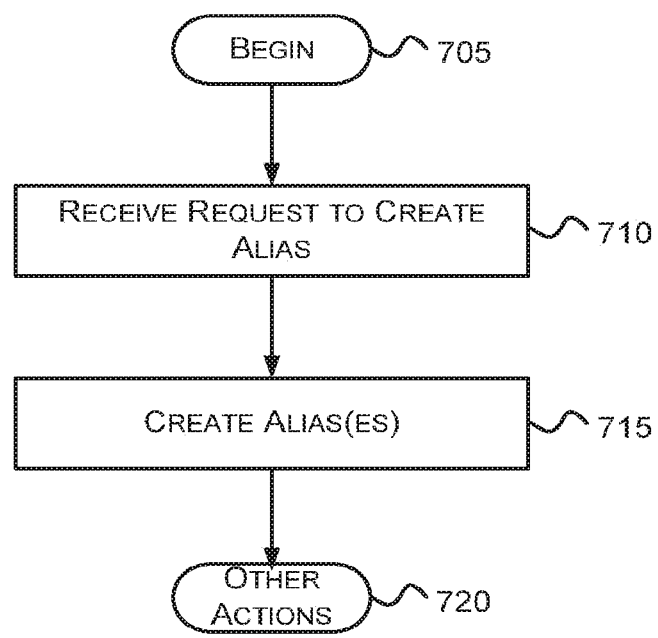
FIG. 7 is a flow diagram that generally represents exemplary actions that may occur in conjunction with creating an alias from a memory controller perspective in accordance with aspects of the subject matter described herein.
Figure 8:
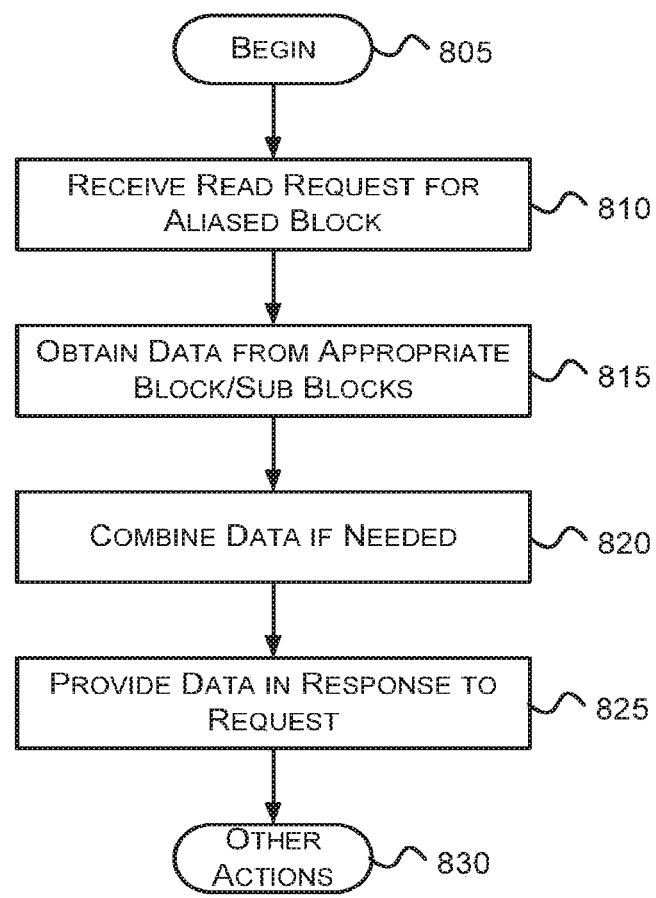
FIG. 8 is a flow diagram that generally represents exemplary actions that may occur in conjunction with obtaining data for an aliased block from a memory controller perspective in accordance with aspects of the subject matter described herein.
Figure 9:
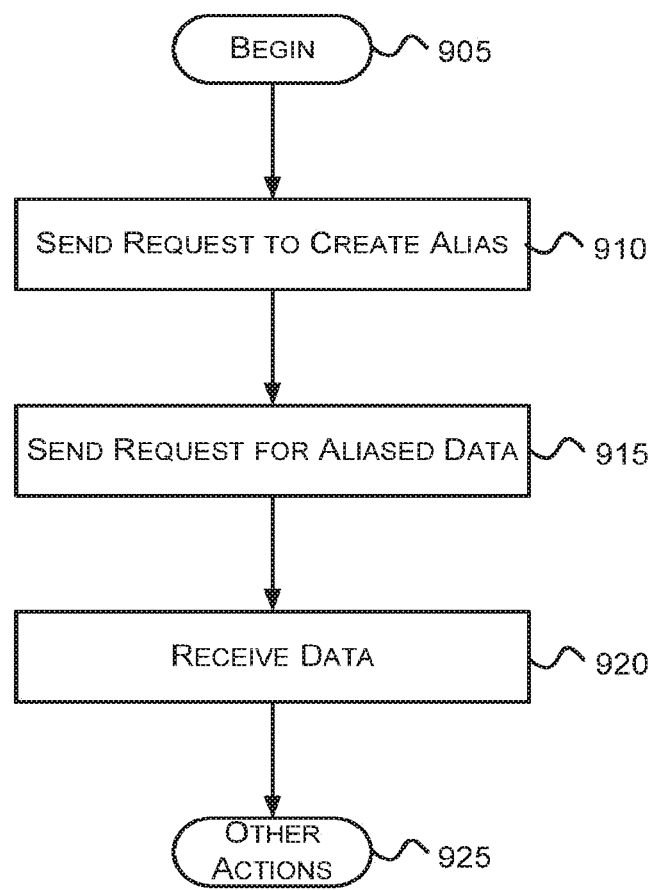
FIG. 9 is a flow diagram that shows exemplary actions that may occur on a component accessing memory via a memory controller in accordance with aspects of the subject matter described herein.

FIGS. 7-9 are flow diagrams that generally represent exemplary actions that may occur in accordance with aspects of the subject matter described herein. For simplicity of explanation, the methodology described in conjunction with FIGS. 7-9 is depicted and described as a series of acts. It is to be understood and appreciated that aspects of the subject matter described herein are not limited by the acts illustrated and/or by the order of acts. In one embodiment, the acts occur in an order as described below. In other embodiments, however, two or more of the acts may occur in parallel or in another order. In other embodiments, one or more of the actions may occur with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 7 is a flow diagram that generally represents exemplary actions that may occur in conjunction with creating an alias from a memory controller perspective in accordance with aspects of the subject matter described herein. 705, the actions begin.

At block 710, a request to create an alias is received. For example, referring to FIG. 6, the memory controller 605 may receive a request to alias a block of memory via the interface 610. This request may come from the file system driver 405. The request may request the creation of an alias between a storage system block of memory and a main memory block of memory.

At block 715, one or more aliases may be created. For example, referring to FIG. 6, the aliasing circuit 615 may create an alias between the two blocks of memory and/or may create aliases between corresponding sub blocks of the two blocks of memory.

At block 720, other actions, if any may be performed. Other actions include, for example, any of the actions described herein with respect to a memory controller.

FIG. 8 is a flow diagram that generally represents exemplary actions that may occur in conjunction with obtaining data for an aliased block from a memory controller perspective in accordance with aspects of the subject matter described herein. At block 805, the actions begin.

At block 810, a read request for an aliased block is received. For example, referring to FIGS. 2 and 6, the memory controller 605 may receive a request to read the data in the block 216. The request may come from the file system driver 405 and may be communicated via the interface 610.

In response to the request, data may be obtained from an appropriate block or sub blocks. For example, referring to FIGS. 3 and 6, if none of the aliases between the sub blocks of blocks 216 and 215 has been severed, then the retrieval circuit 617 may obtain data from the block 215. If aliases have been severed as shown in FIG. 3, then the retrieval circuit 617 may obtain the data from sub blocks of the block 215 where the aliased have not been severed and from the sub blocks 301, 302, and 303, where the aliases have been severed.

At block 820, data is combined if needed. If some but not all of the aliases of sub blocks have been severed, data from sub blocks that are included in different blocks may be combined in response to the request. For example, referring to FIGS. 3 and 6, if none of the aliases between the sub blocks of blocks 216 and 215 have been severed, then the retrieval circuit 617 may have no need to combine sub blocks from different blocks of memory; otherwise, the retrieval circuit 617 may combine data from the sub blocks 301, 302, and 303 with data from the sub blocks of block 215 where the aliases have not been severed.

At block 825, the data is provided in response to the request. For example, referring to FIG. 6, the memory controller 605 may provide the data to the file system driver 405 via the interface 610.

At block 830, other actions, if any, may be performed.

FIG. 9 is a flow diagram that shows exemplary actions that may occur on a component accessing memory via a memory controller in accordance with aspects of the subject matter described herein. At block 905, the actions begin.

At block 910, a request to create an alias is sent. For example, referring to FIG. 6, the file system driver 405 may send a request to create an alias between two blocks of memory. This request may be sent to the memory controller 605 via the interface 610.

At block 915, after the request to create the alias has been sent, a request for the aliased data may be sent. For example, referring to FIGS. 2 and 6, the file system driver 405 may send a request addressed to the block 216. This request may also be sent to the memory controller 605 via the interface 610.

At block 920, in response to the request, data may be received. For example, referring to FIGS. 2 and 6, in response to the request previously sent, the file system driver 405 may receive data that has been obtained from the block 215.

At block 925, other actions, if any, may be performed.

As can be seen from the foregoing detailed description, aspects have been described related to storage systems and aliases. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed:

1. A memory controller configured to:
   create one or more aliases between a storage system block of memory and a main memory block of memory; and
   in response to a read request for data from the main memory block, read data from the storage system block of memory and not the main memory block, based at least in part on the alias; and
   when a portion of the main memory block is written to, severing at least one of the aliases between the storage system block of memory and the main memory block of memory.

2. The memory controller of claim 1, wherein the storage system block of memory stores file system data of a file system.

3. The memory controller of claim 1, further comprising an interface structured to receive a request to create the aliases.

4. The memory controller of claim 1, wherein the request is received from a file system driver of an operating system.

5. The memory controller of claim 1, wherein the main memory block of memory comprises a page of memory comprising one or more cache lines.

6. The memory controller of claim 1, wherein the alias comprises aliases between sub blocks of the storage system block of memory and corresponding sub blocks of the main memory block of memory; wherein the memory controller is further configured to:
   obtain first data from sub blocks of the storage system block where aliases have not been severed;
   obtain second data from sub blocks of the main memory block where aliases have been severed; and
   combine the first data and the second data in response to the read request.

7. The memory controller of claim 1, wherein the alias comprises aliases between sub blocks of the storage system block of memory and corresponding sub blocks of the main memory block of memory; wherein the memory controller is further configured to sever an alias from a first sub block to a second sub block in response to a request to write to the first sub block or to write to the second sub block.

8. The memory controller of claim 7, wherein the memory controller is further configured to sever the alias from the first sub block to the second sub block prior to servicing a request to read from the first sub block.

9. The memory controller of claim 1, wherein the memory controller is further configured to copy the main memory block to a new location.

10. The memory controller of claim 9, wherein the memory controller is further configured to respond to a request to copy the main memory block to a new location by changing mapping elements and return requested data from the new location based on the changed mapping elements.

11. The memory controller of claim 1, wherein the memory controller is further configured to respond to a request to zero a requested range of memory that includes some or all of the main memory.

12. The memory controller of claim 11, wherein the memory controller is further configured to respond to the request to zero a requested range of the memory by:
    flagging that the requested range is zeroed; and
    in response to a read request that involves the requested range of memory, writing zeroes to a read cache.

13. The memory controller of claim 11, wherein the memory controller is further configured to respond to the request to zero the requested range of the memory by zeroing the requested range of memory after receiving an indication of a restart of a computer hosting the main memory.

14. The memory controller of claim 1, wherein the memory controller is further configured to re-alias an aliased block in response to a request to move the aliased block.

15. The memory controller of claim 1, wherein the main memory block and the storage system block of memory are both included in nonvolatile memory that is communicatively couple to a memory bus.

16. A method implemented at least in part by a computing device, the method comprising:
    receiving a request to create one or more aliases between a storage system block of memory and a main memory block of memory; and
    in response to the request, creating the alias between the storage system block of memory and the main memory block of memory;

wherein the alias causes read requests for data stored in the main memory block of memory to be read from the storage system block of memory, and wherein at least one of the aliases between the storage system block of memory and the main memory block of memory is severed when a portion of the main memory block is written to.

17. The method of claim 16, wherein one of the storage system block of memory or the main memory block of memory is included on a nonvolatile memory device and the other of the storage system block of memory or the main memory block of memory is included on a volatile memory device.

18. The method of claim 16, further comprising receiving a request to create the alias between the storage system block of memory and the main memory block of memory, wherein the storage system block of memory stores storage system data and the main memory block of memory is a main memory of the computing device.

19. The method of claim 16, wherein the alias comprises aliases between sub blocks of the storage system block of memory and corresponding sub blocks of the main memory block of memory; further comprising, in response to the request for data:

obtaining first data from sub blocks of the storage system block where aliases have not been severed; and obtaining second data from sub blocks of the main memory block where aliases have been severed; and combining the first data and the second data to respond to the request for data.

20. A computer storage medium having stored thereon computer-executable instructions, which when executed by a computing device, cause the computing device to perform operations comprising:

sending a request for data stored in a first block of memory; and in response to the request for data, receiving, data from a second block of memory, wherein the data is read from the second block of memory in response to the request for data stored in the first block of memory based at least in part on an alias between the first and second blocks of memory, and wherein the alias is severed when a portion of the first block of memory is written to.

* * * * *